United States Patent
Hanya et al.

(10) Patent No.: US 6,343,636 B1
(45) Date of Patent: *Feb. 5, 2002

(54) PNEUMATIC TIRE INCLUDING NON-DIRECTIONAL TREAD PATTERN

(75) Inventors: Masahiro Hanya; Mitsuhiro Wada, both of Kobe; Naoki Yukawa, Takarazuka, all of (JP)

(73) Assignee: Sumitomo Rubber Industries, Ltd., Hyogo-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/884,646

(22) Filed: Jun. 27, 1997

(30) Foreign Application Priority Data

Jun. 28, 1996 (JP) .............................. 8-169676
Jul. 17, 1996 (JP) .............................. 8-187660
Dec. 2, 1996 (JP) .............................. 8-321860

(51) Int. Cl.$^7$ .................... B60C 11/03; B60C 11/13; B60C 103/04
(52) U.S. Cl. ................. 152/209.24; 152/526; 152/535; 152/538; 152/903
(58) Field of Search .................... 152/209 R, 209 D, 152/209.18, 209.24, 903, 526, 535, 538

(56) References Cited

U.S. PATENT DOCUMENTS

| | | | | |
|---|---|---|---|---|
| 3,674,077 A | * | 7/1972 | Verdier .................... | 152/209 R |
| 4,424,843 A | * | 1/1984 | Fontaine et al. ......... | 152/209 R |
| 4,641,695 A | * | 2/1987 | Lindner .................... | 152/209 R |
| 4,819,704 A | | 4/1989 | Misawa et al. | |
| 5,234,042 A | * | 8/1993 | Kuhr et al. .............. | 152/209 R |
| 5,526,860 A | * | 6/1996 | Minami .................... | 152/209 R |
| 5,567,253 A | * | 10/1996 | Iwamura ................... | 152/209 R |
| 5,593,521 A | * | 1/1997 | Iseki ...................... | 152/209 R |
| 5,837,074 A | * | 11/1998 | Uemura ................... | 152/209 R |
| 6,070,631 A | * | 6/2000 | Armellin et al. ........ | 152/209.24 |

FOREIGN PATENT DOCUMENTS

| | | | | |
|---|---|---|---|---|
| EP | 0371788 | | 6/1990 | |
| EP | 0588781 | | 3/1994 | |
| EP | 627332 | * | 12/1994 | ............. 152/209 R |
| EP | 0782936 | | 7/1997 | |
| FR | 2388685 | | 11/1978 | |
| JP | 61-200007 | * | 9/1986 | ............. 152/209 R |
| JP | 7-246806 | | 9/1995 | |

* cited by examiner

*Primary Examiner*—Steven D. Maki
(74) *Attorney, Agent, or Firm*—Birch, Stewart, Kolasch & Birch, LLP

(57) ABSTRACT

A pneumatic tire which comprises a tread portion provided on each side of the tire equator with axial grooves extending axially inwardly from the tread edges, the axial grooves inclined to one direction with respect to the tire axial direction to form a non-directional tread pattern, and the inclination angle of the axial grooves to the tire circumferential direction is decreased from the axially outer end to the axially inner end thereof so as to have a minimum inclination angle βmin of less than 45 degrees, and a maximum inclination angle of from 60 to 85 degrees. Preferably, the radially outermost belt ply has a cord angle a of 10 to 35 degrees to the tire equator and the axial grooves inclined in the reverse direction to the belt cords, and |βmin−α|≦25 degrees. The tread block has a toe edge and a heel edge both inclined to the same direction with respect to the tire axial direction so that each of the edges has a far end and a near end, and the inclination angle of the side face of the block gradually increases from the near end to the far end. The number of the axially inner blocks is a one half of the axially outer blocks.

11 Claims, 15 Drawing Sheets

PNEUMATIC TIRE INCLUDING NON-DIRECTIONAL TREAD PATTERN

The present invention relates to a pneumatic tire having an improved non-directional tread pattern.

Recently, a non-directional tread pattern which is generally symmetrical about a point on the tire equator is widely used in passenger car tires.

In the non-directional tread patterns, axial grooves extending axially inwardly from the tread edges (E) are inclined to the same direction with a left side upward inclination as shown in FIG. 2 or a right side upward inclination as shown in FIGS. 4(a)–(b).

In general, the inclination angle ($\beta$) of the axial grooves (a) and (b) to the tire circumferential direction is set in the range of more than 50 degrees as shown in FIGS. 4(a)–(b).

On the other hand, in the passenger car tires, a relatively low aspect ratio is widely employed nowadays. In other words, a relatively wide tread where drainage from the central part thereof is difficult is employed.

If the number and/or width of the axial grooves (a) and (b) which extend from the tread central part to the tread edges (E) are increased, the drainage can be improved, but the pitch noise is inevitably increased. Thus, such measures can not be taken. The pitch noise is a noise generated from the blocks (c) which periodically contact with the road surface during running.

The present inventors tried decreasing the inclination angle of the axial grooves to a value in the range of less than 45 degrees which is considerably smaller than the above-mentioned conventional range, and found that the drainage can be increased without increasing the axial grooves.

However, the blocks between the axial grooves are liable to decrease in the rigidity. Thus, the blocks are liable to slip against the road surface during running. Such slippage not only decreases the steering stability but also generates another type of noise (hereinafter slip noise) having a sharp peak (e) at about 1.6 KHz as shown in FIG. 3 in solid line.

Therefore, a primary object of the present invention is to provide a pneumatic tire having a non-directional tread pattern in which the inclination angle of axial grooves to the circumferential direction is decreased to a relatively small value to improve the wet performance.

Another object of the present invention is to improve the steering stability and slip noise by controlling the slippage of the blocks by specifically limiting the cord inclination of a radially outermost belt ply with relation to the inclination of the axial grooves.

As inclination angle of the axial grooves is considerably decreased as explained above, another problem arises. In such a non-directional tread pattern, the residual cornering force (CF) is liable to increase, and the problem—drifting to one side of a vehicle arises.

Therefore, still another object of the present invention is to control the residual cornering force to prevent the drifting to one side of a vehicle without sacrificing the wet and dry running performance.

Furthermore, it was found that the steering stability can be improved by increasing the circumferential pitch lengths of the axial grooves. However, if the pitch lengths are increased, as the number of the axial grooves decreases, wet performance decreases.

In general, on the other hand, the above-mentioned pitch noise can be reduced by employing variable pitches. However, if the pitch lengths are increased, the pitch noise reduction also becomes ineffectual.

Therefore, still more another object of the present invention is to improve the steering stability without sacrificing the wet performance and pitch noise by increasing the pitch lengths in the tread middle part but decreasing the pitch lengths in the tread shoulder part.

According to one aspect of the present invention, a pneumatic tire comprises a tread portion with tread edges, a pair of sidewall portions, a pair of bead portions, a carcass extending between the bead portions, and a belt disposed radially outside the carcass in the tread portion, the tread portion provided on each side of the tire equator with axial grooves extending axially inwardly from the tread edges, the axial grooves inclined to the same direction with respect to the tire axial direction to form a non-directional tread pattern, the inclination angle of the axial grooves with respect to the tire circumferential direction is decreased from the axially outer end to the axially inner end thereof, wherein the minimum inclination angle of each axial groove is less than 45 degrees, and a maximum inclination angle is 60 to 85 degrees.

Embodiments of the present invention will now be described in detail in conjunction with the accompanying drawings.

Figure 4A:
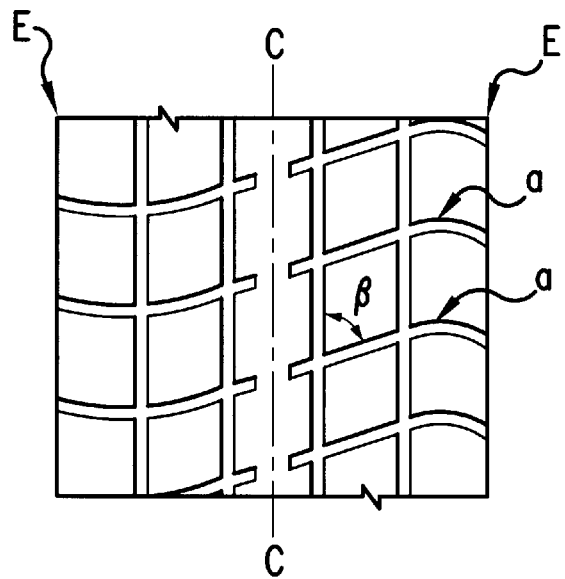
Figure 4B:
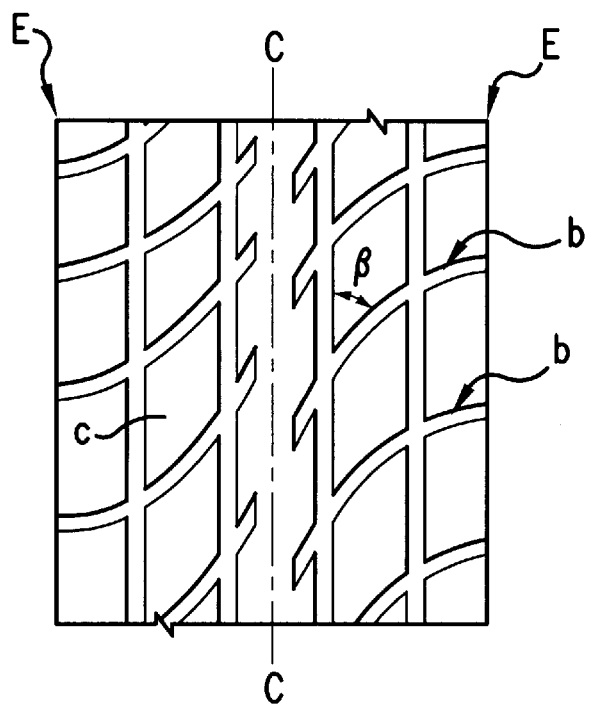

FIGS. 4(a)–(b) shows treadpatterns according to prior art.

Figure 5:
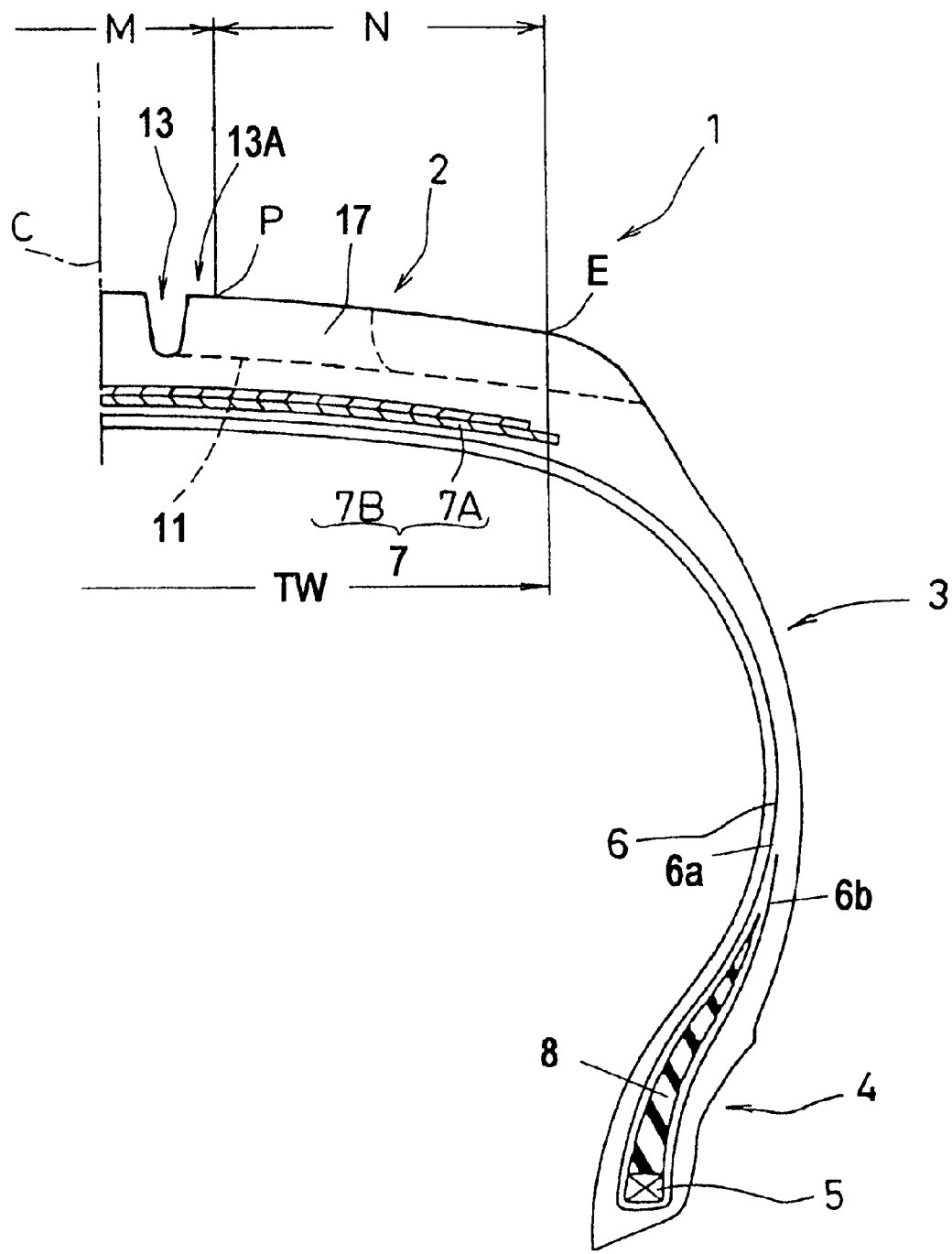

FIG. 5 is a cross sectional view of another embodiment of the present invention.

Figure 6:
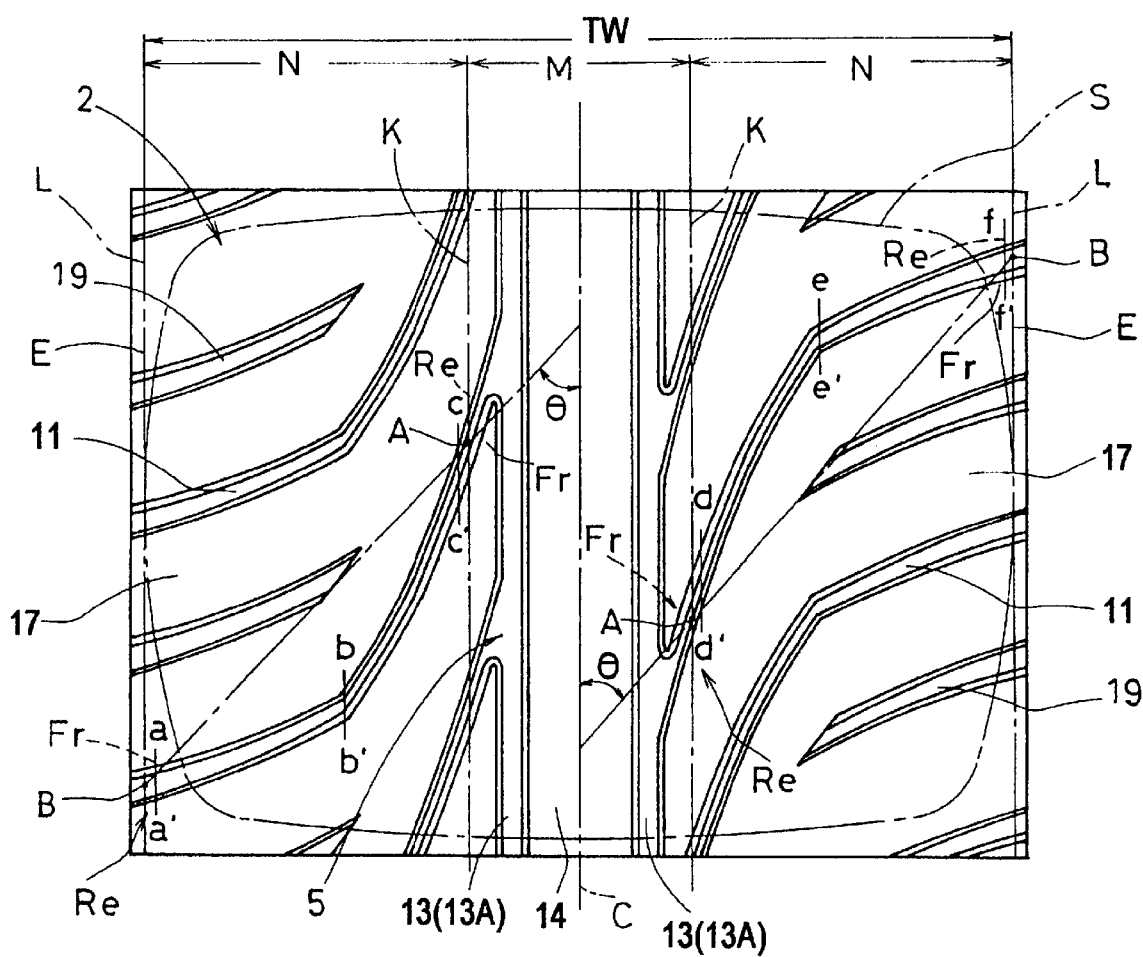
Figure 7A:
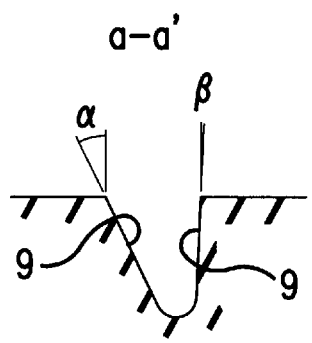
Figure 7B:
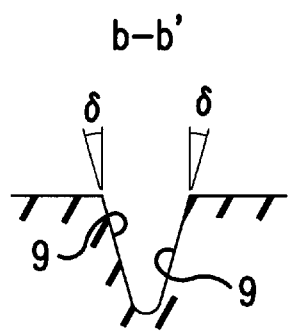
Figure 7C:
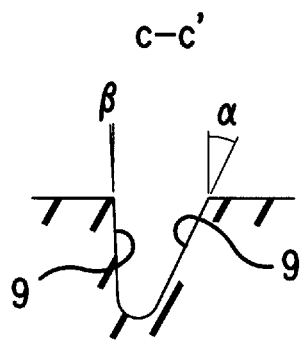
Figure 7D:
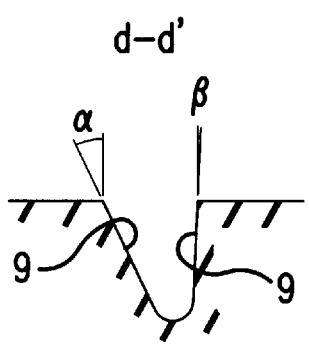
Figure 7E:
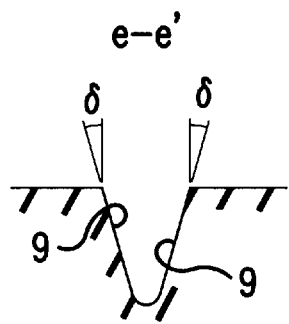
Figure 7F:
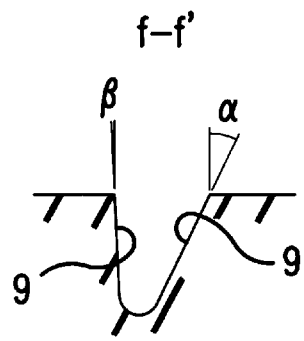

FIG. 6 is a schematic view showing an example of the tread pattern thereof.

FIGS. 7(a), 7(b), 7(c), 7(d), 7(e) and 7(f) each show cross-sectional views of the axial grooves along lines a–a', b–b', c–c', d–d', e–e' and f—f, respectively.

Figure 8:
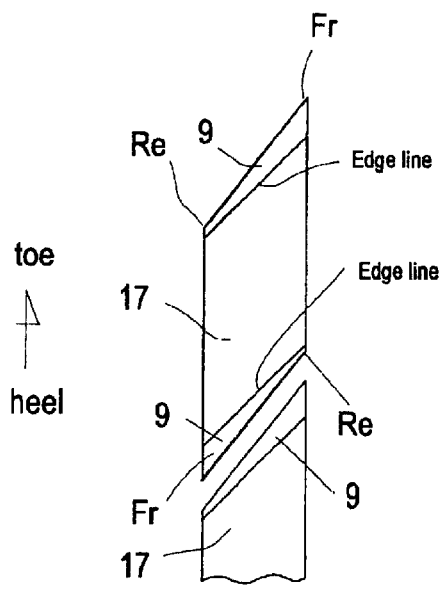

FIG. 8 is a diagram explaining the wording concerning the block.

Figure 9:
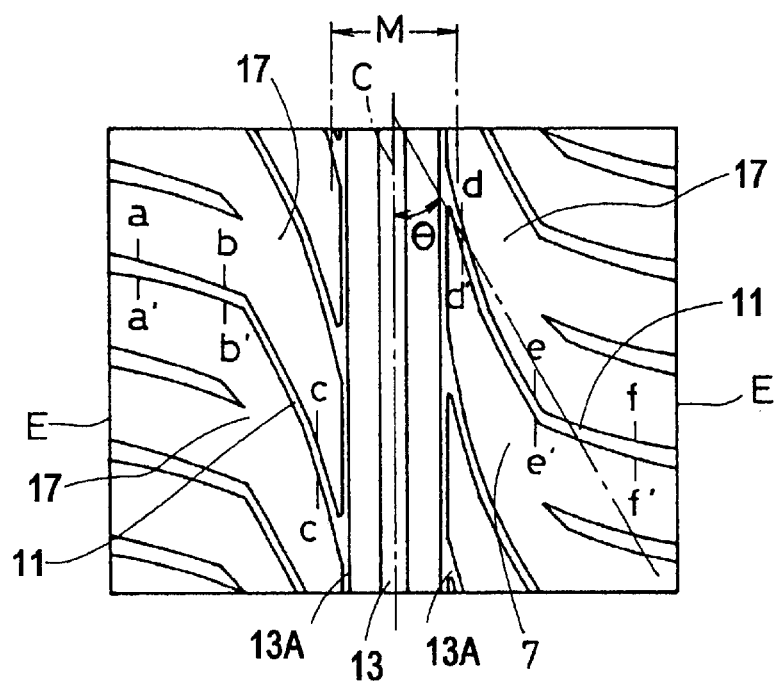

FIG. 9 is a developed plan view showing another example of the tread pattern.

Figure 10:
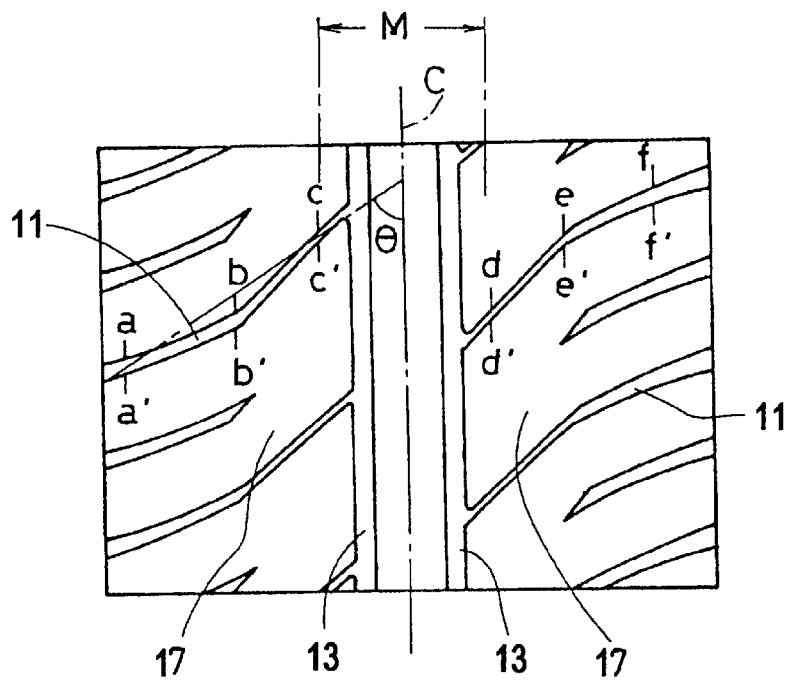
Figure 11:
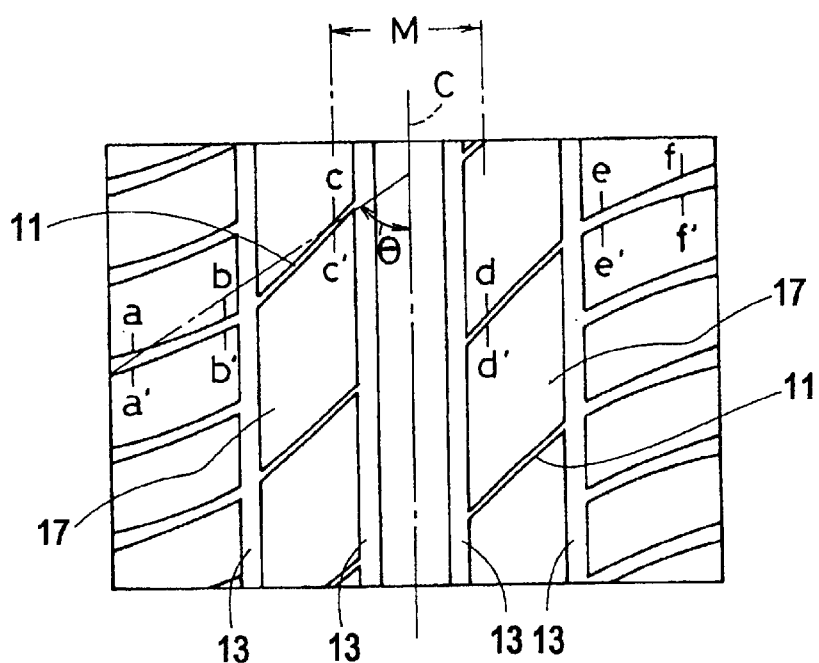

FIGS. 10 and 11 show the tread patterns used in comparison tests.

Figure 12:
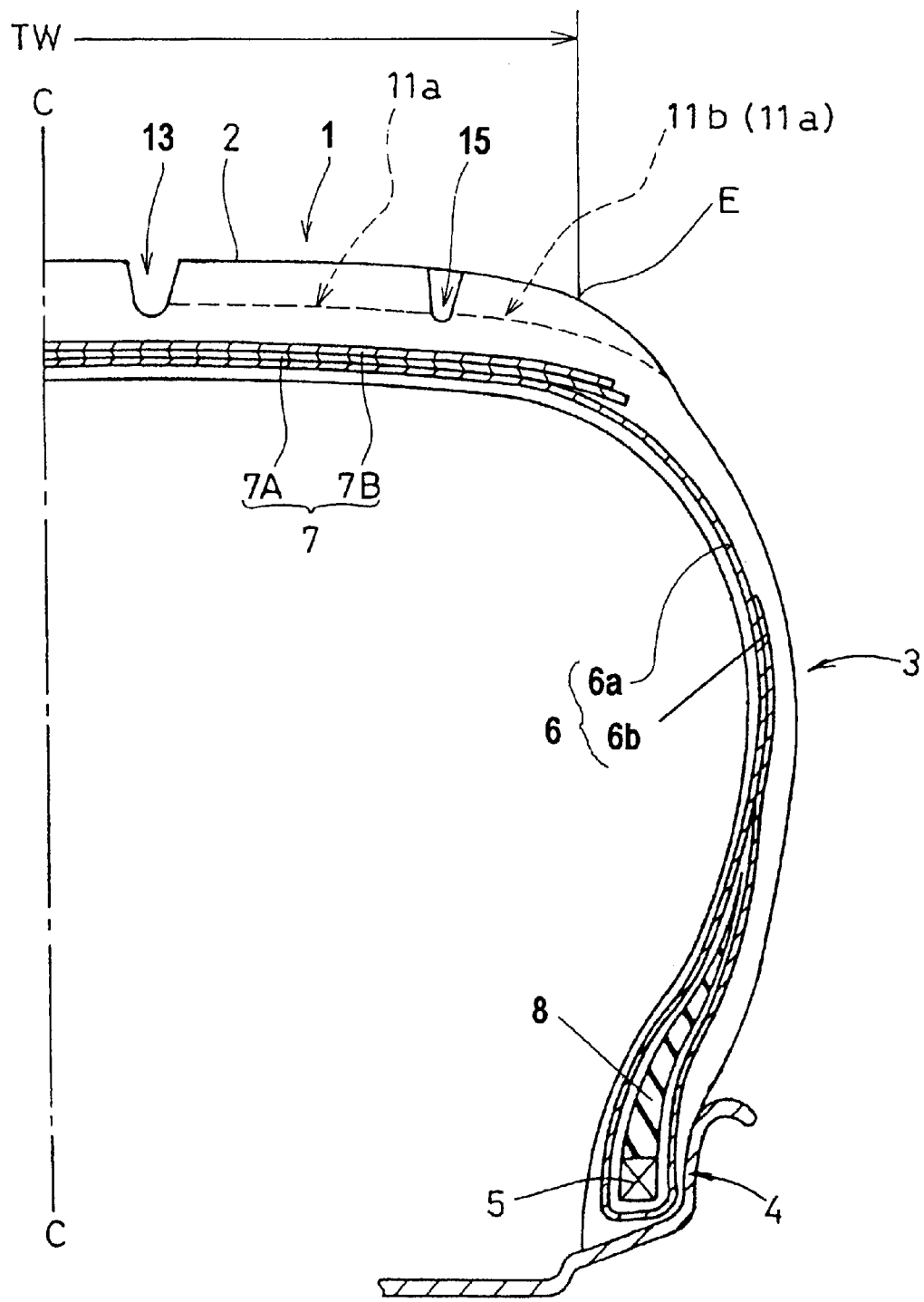

FIG. 12 is a cross sectional view of still another embodiment of the present invention.

Figure 13:
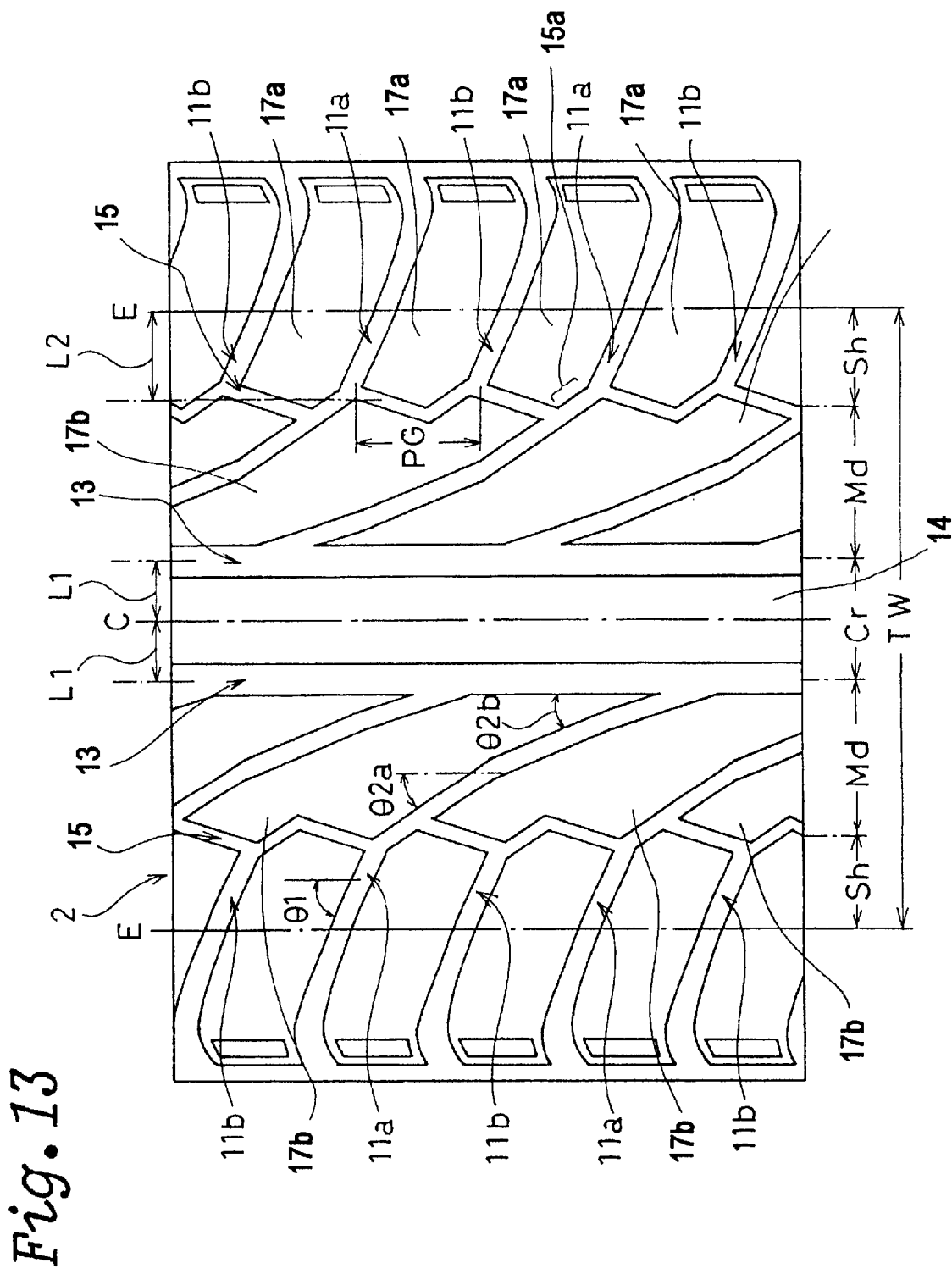

FIG. 13 is a developed view of an example of the tread pattern thereof.

Figure 14:
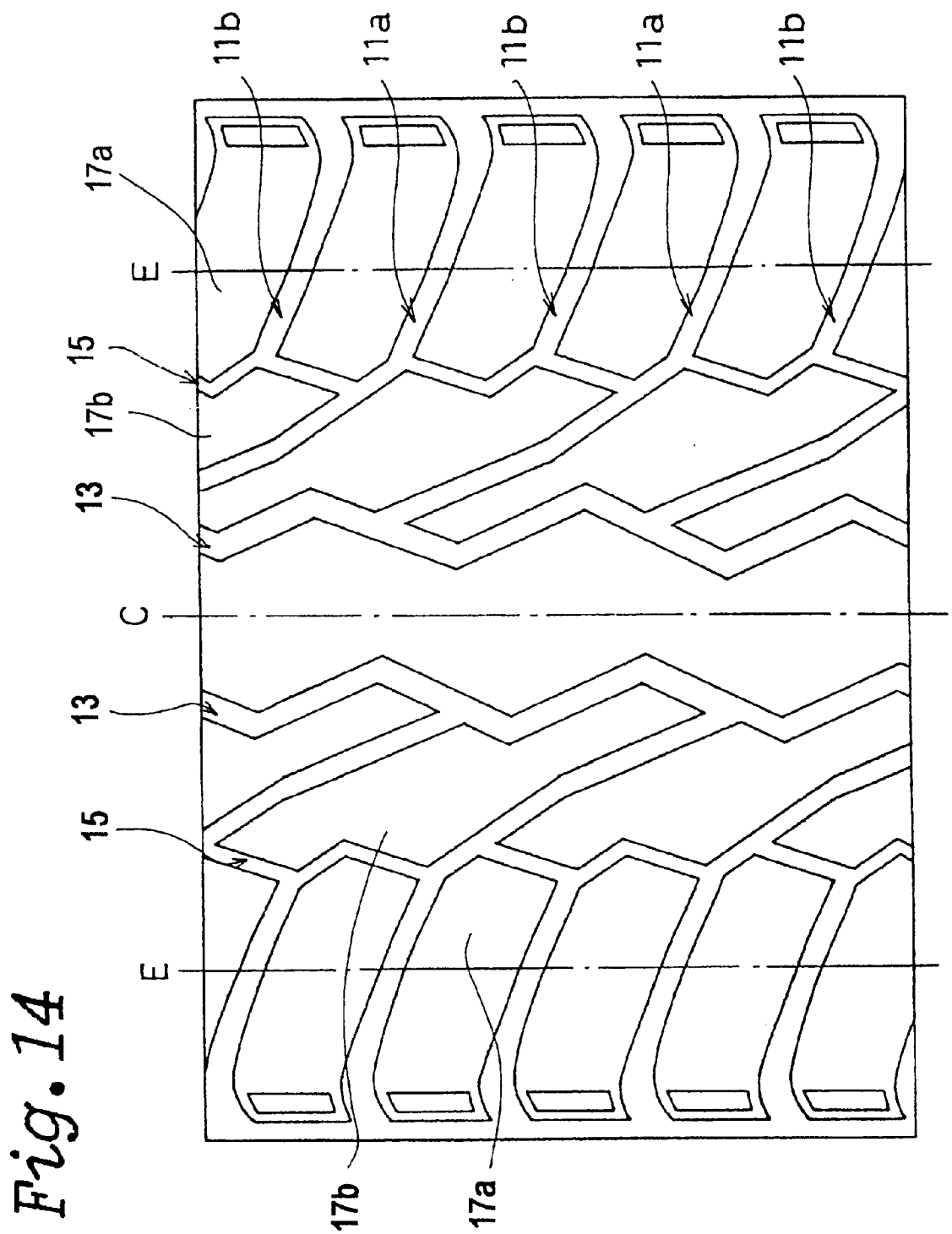
Figure 15:
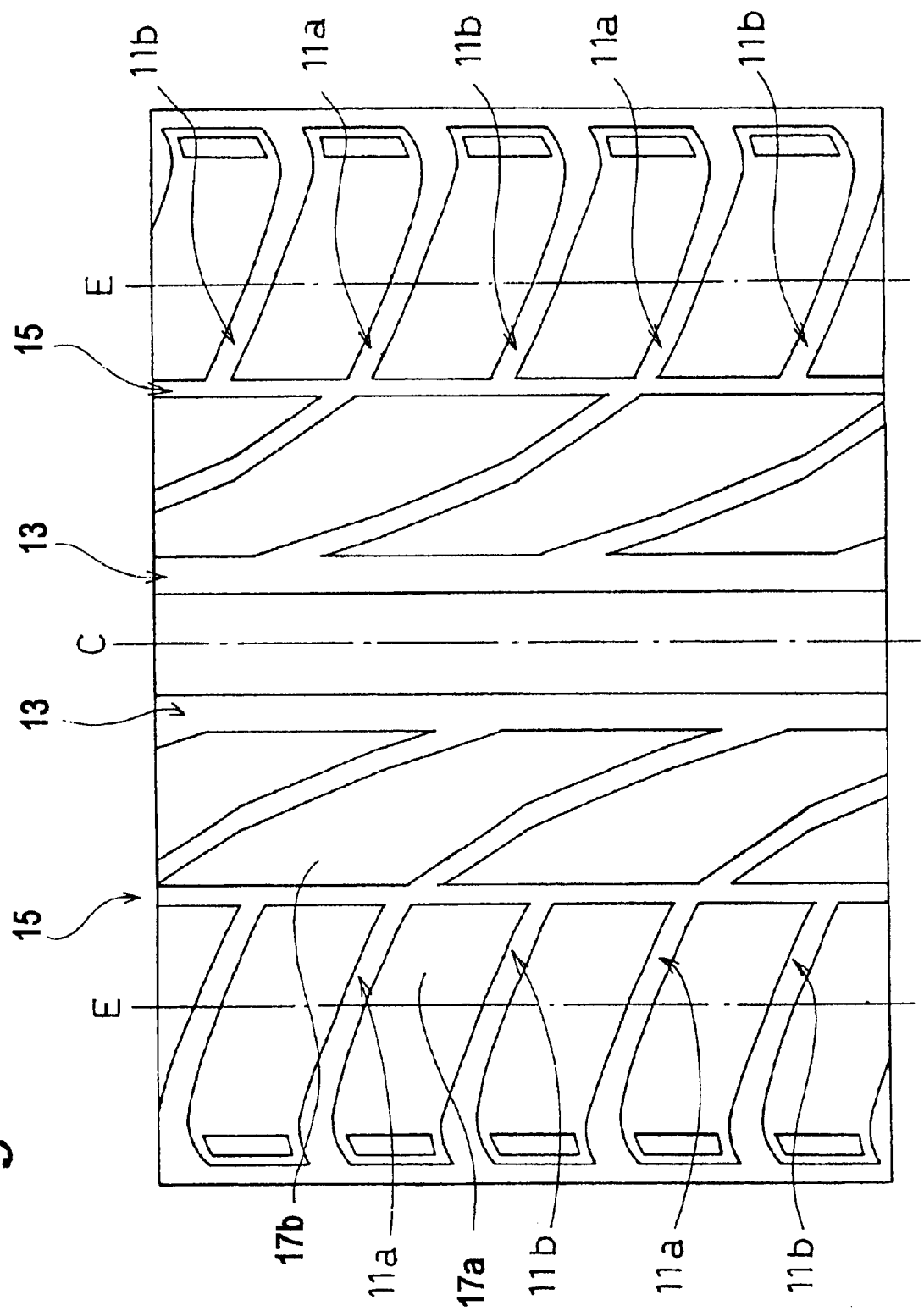

FIGS. 14 and 15 are developed views each showing another example of the tread pattern.

Figure 16:
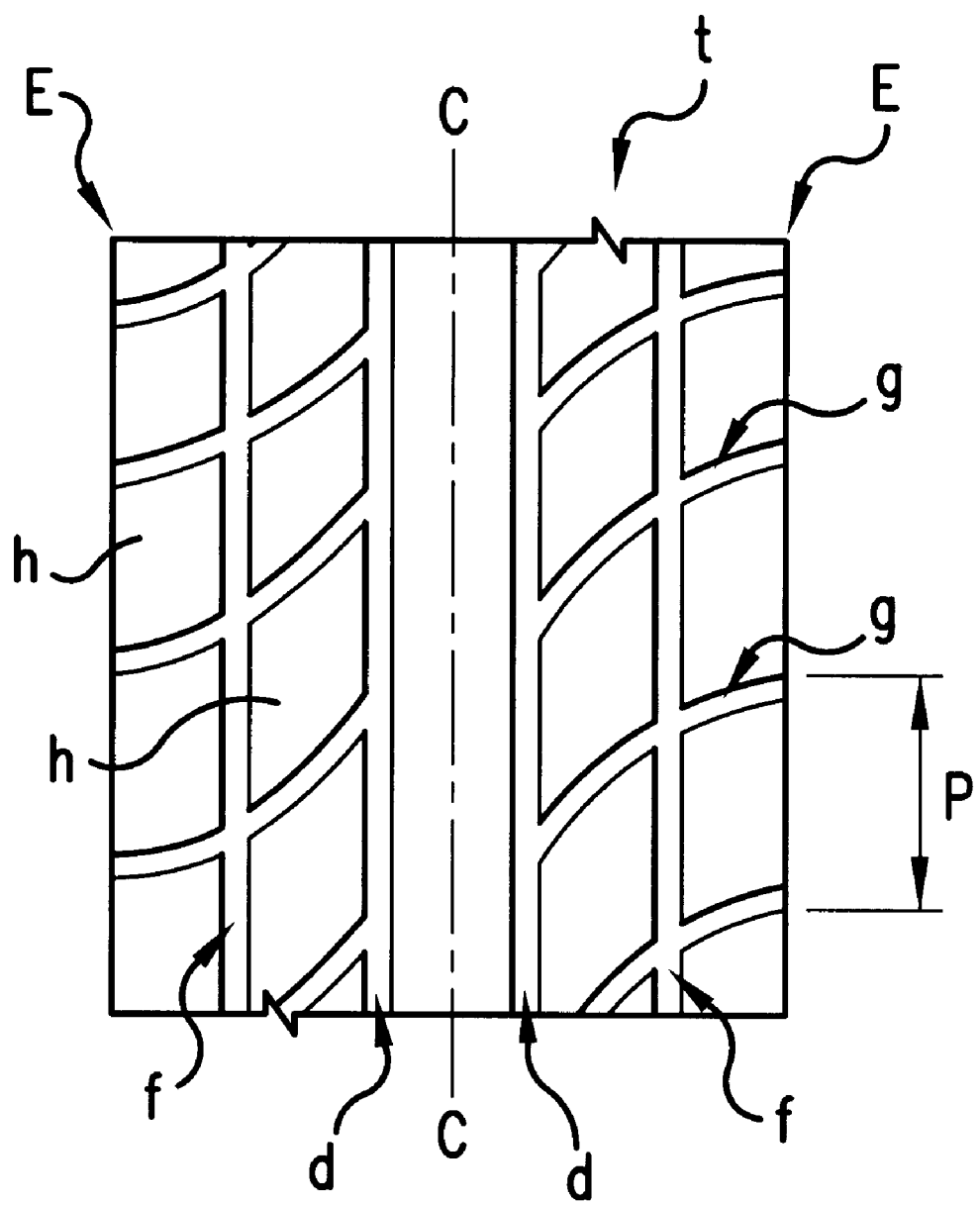

FIG. 16 is a developed view showing a tread pattern according to prior art.

Figure 17:
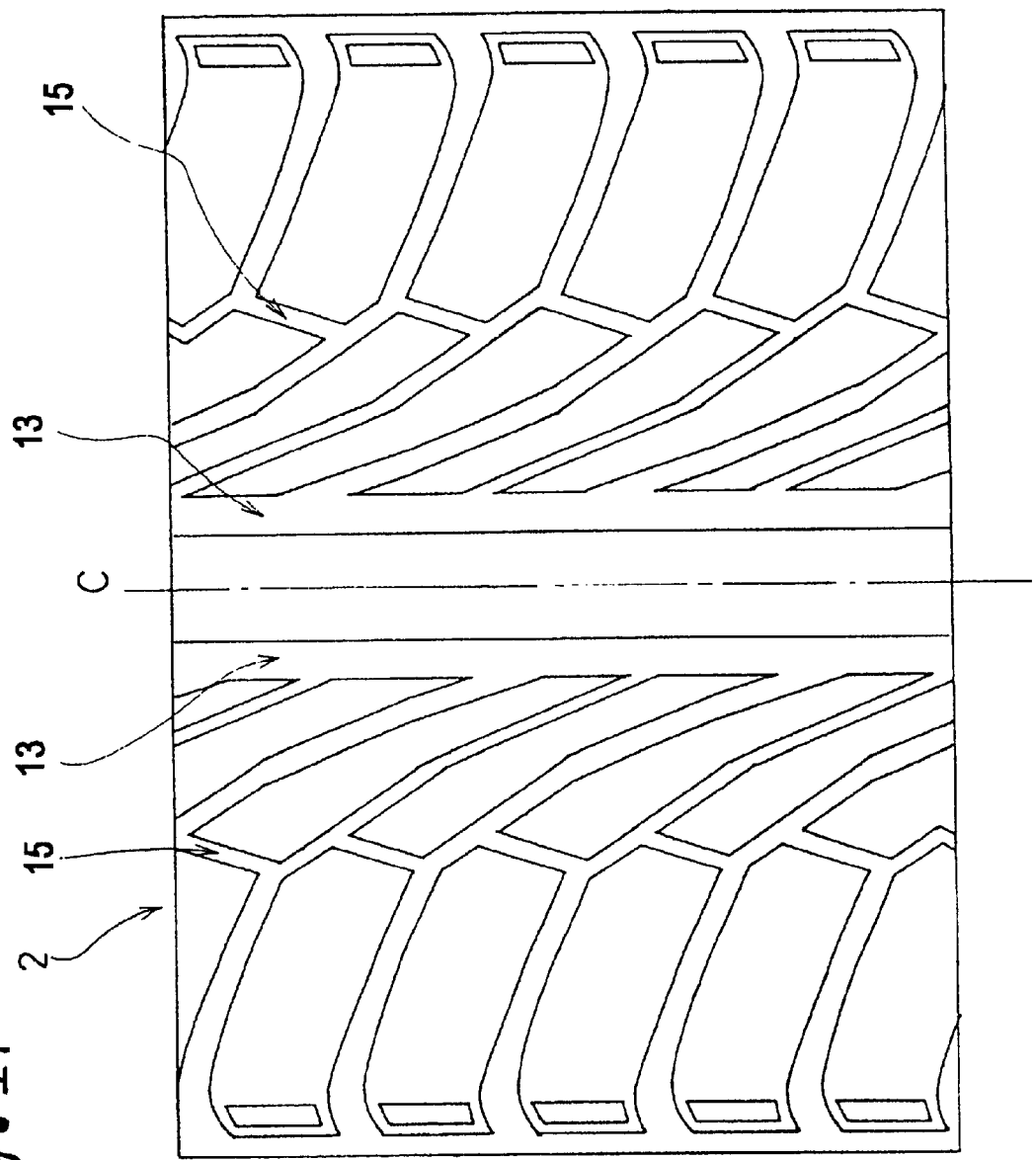

FIG. 17 is a developed view showing a tread pattern used in comparison tests.

In the figures showing the embodiments of the present invention, the pneumatic tire 1 comprises a tread portion 2, a pair of sidewall portions 3, a pair of bead portions 4 with a bead core 5 therein, a carcass 6 extending between the bead portions 4, and a belt 7 disposed radially outside the carcass 6 and inside the tread portion 2.

The invention is suitably applied to a radial tire for passenger cars whose aspect ratio (section height/section width) is less than 70%, preferably 60 to 70%.

The carcass 6 comprises at least one ply of cords arranged radially at an angle of from 90 to 70 degrees with respect to the tire equator (C), the ply extending between the bead portions through the tread portion 2 and sidewall portions and being turned up around the bead cores 5 from the axially inside to the outside of the tire to form a pair of turnup portions 6b and one main portion 6a therebetween.

Further, each bead portion is provided between the main portion 6a and each turnup portion 6b of the carcass 6 with a bead apex 8 made of a hard rubber extending radially outwardly from the bead core 5.

The belt 7 is disposed radially outside the carcass 6 and inside the tread portion 2 and comprises at least two cross plies 7A and 7B of cords laid at an angle of from 10 to 35 degrees with respect to the tire equator so that the cords of each ply cross the cords of the next ply. For the belt cords, high modulus metal cords such as steel cords are preferably used. Further, high modulus organic fiber cords such as aramid, rayon and the like can be used.

Figure 1:
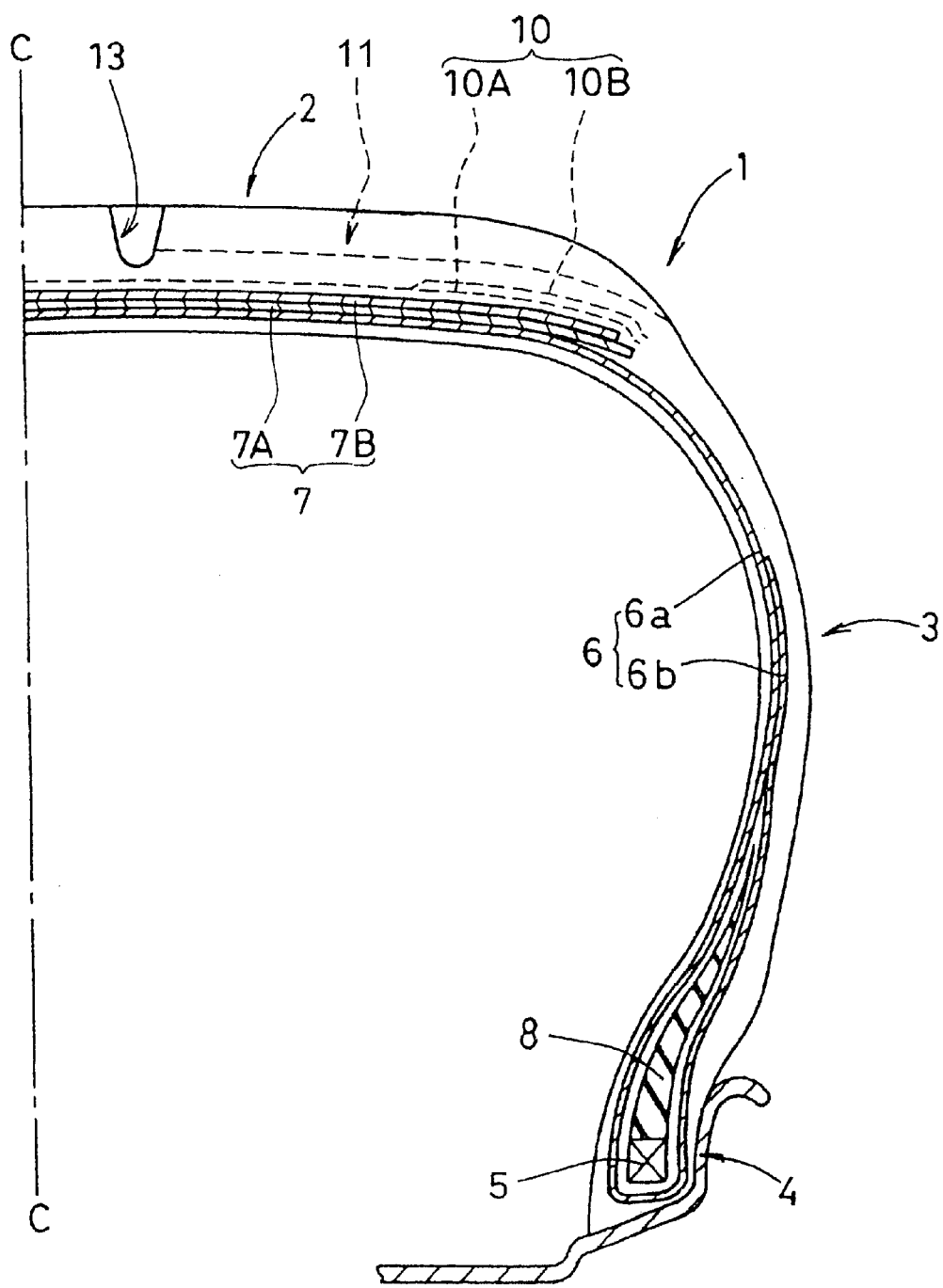
FIG. 1 is a cross sectional view of an embodiment of the present invention.

As shown in FIG. 1, it is possible to dispose a band 10 radially outside the belt 7 to prevent the belt edges from being lifted during high speed running and thereby to improve the high speed durability. The band is made of a low modulus organic fiber cord such as nylon and the cord angle is very small or substantially zero degree to the tire circumferential direction.

The tread portion 2 is provided with a non-directional pattern which is generally point-symmetrical about a point on the tire equator (C). In a tread central portion defined as having an axial width of 45% of the tread width, at least one circumferential groove 13 is disposed. And, on each side of the tire equator (C), axial grooves 11 extending from the circumferential groove 13 to the tread edge (E) are disposed to define circumferentially spaced blocks 17. All the axial grooves 11 are inclined to the same direction with respect to the tire axial direction. The inclination angle of the axial grooves 11 with respect to the tire circumferential direction is decreased from the axially outer end to the axially inner end. As a result, each axial groove 11 is curved smoothly or bent by two or more steps. The minimum inclination angle of each axial groove 11 is set to be less than 45 degrees, more preferably less than 40 degrees. Preferably, the maximum inclination angle is set in the range of from 60 to 85 degrees.

EMBODIMENT 1

In order to improve the steering stability and slip noise by controlling the slippage of the blocks 17, the cord inclination of a radially outermost belt ply is specifically limited with relation to the inclination of the axial grooves.

Figure 2:
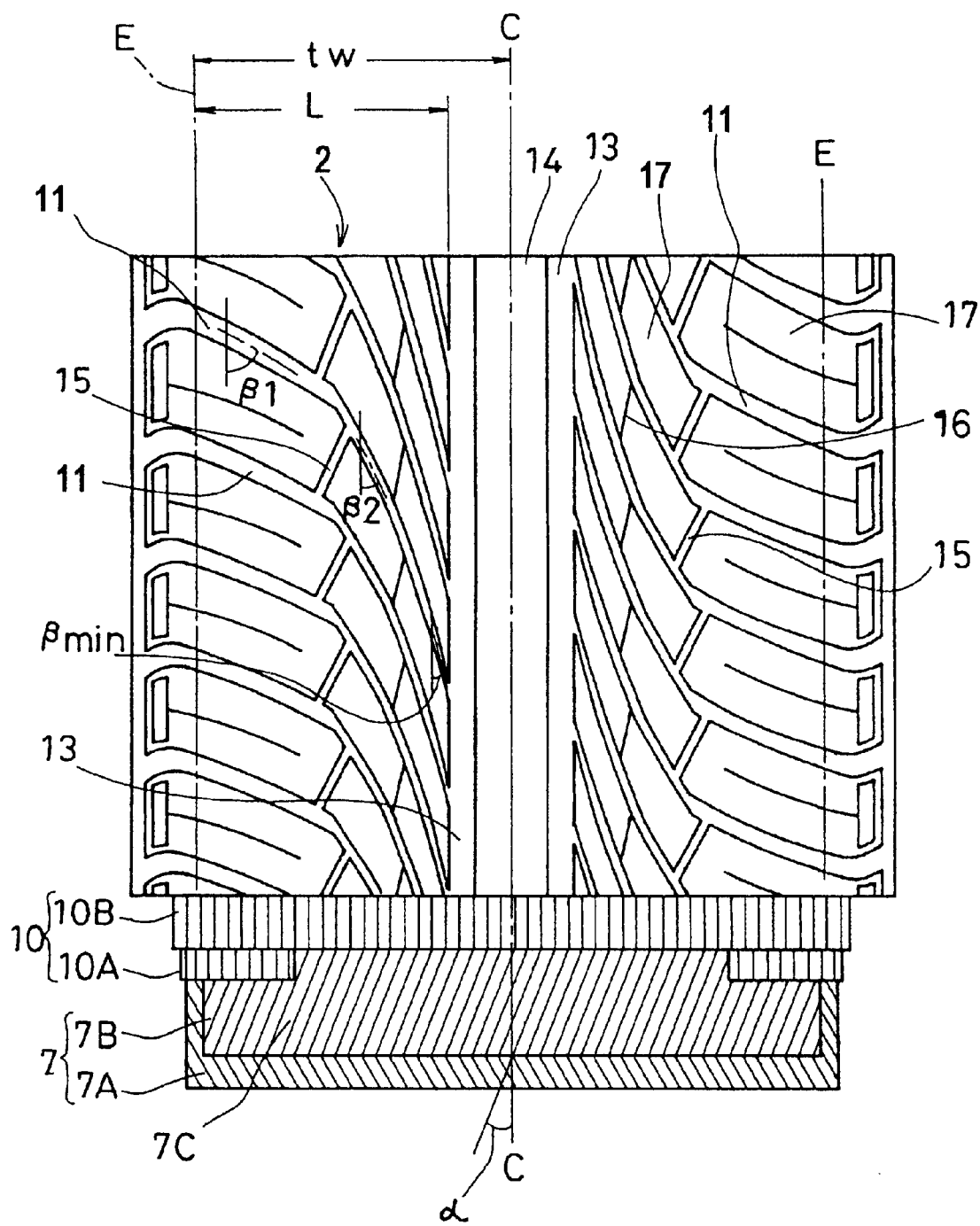
FIG. 2 is a developed plan view showing an example of the tread pattern thereof.
Figure 3:
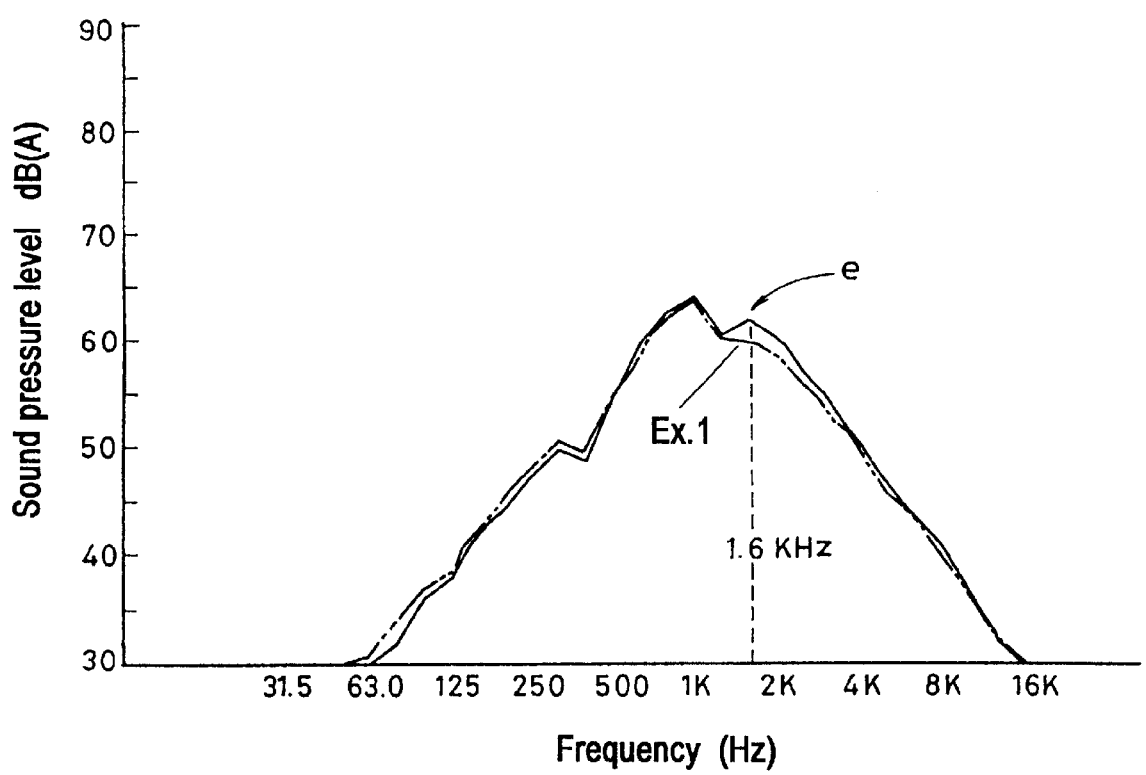
FIG. 3 is a graph showing frequency spectrum of overall tire noise.

In FIGS. 1–3 concerning the first embodiment the tire 1 is a radial tire for passenger cars.

The carcass 6 comprises a single ply. The turnup portions 6b thereof extend radially outwardly beyond one half of the tire section height to form the so called (1–0) high turnup structure.

The belt 7 comprises a radially inner ply 7B and a radially outermost ply 7A.

In this example, on the radially outside of the belt 7, a band 10 is disposed, which band comprises a pair of narrow-width edge plies 10A covering only the axial edge portions of the belt 7, and a full-width ply 10B disposed radially outside the edge plies 10A to cover substantially allover the width of the belt 7. The band 10 is preferably formed in the so called jointless structure by spirally winding a ribbon-like narrow ply or a strip of rubber in which one ore more cords are embedded. The band 10 is not always necessary, and it may be omitted.

The tread portion 2 in this embodiment is provided on each side of the tire equator (C) with a circumferential groove 13 disposed near the tire equator (C) and extending straight in the tire circumferential direction. Further, the tread portion 2 is provided on the right side and left side of the tire equator (C) with right and left axial grooves 11 which extend from the right and left tread edges (E) toward the tire equator (C).

Each of the axial grooves 11 is connected to one of the straight circumferential grooves 13 and terminates at the circumferential groove 13. Therefore, a continuously extending straight rib 14 is formed between the circumferential grooves 13. The straight circumferential grooves 13 preferably have a groove width of 4 to 20 mm, and a groove depth of 5 to 10 mm.

Each of the axial grooves 11 is inclined such that the inclination angle β thereof to the tire circumferential direction gradually decreases from the tread edge (E) toward the tire equator (C) along its entire length L starting from the tread edge (E), that is, $$\beta_1 > \beta_2 > \text{- - -} > \beta_{min}$$

as shown in FIG. 2.

In this embodiment, the axial grooves 11 have a left side upward inclination.

The minimum angle βmin of the axial groove 11 is set in the range of not more than 45 degrees, preferably 15 to 40 degrees, more preferably 20 to 35 degrees.

The axial length L of the axial groove 11 measured from the tread edge (E) to the axial inner end is set in the range of 55 to 100%, preferably 60 to 90%, more preferably 70 to 85% of a half tread width tW.

Therefore, in the tread shoulder region which affects the cornering performance, the blocks 17 between the axial grooves 11 are increased in the rigidity in the axial direction of the tire, and the steering stability can be improved. On the other hand, in the central part of the tread, the drainage therefrom is increased.

Further, each part or block between the circumferentially adjacent axial grooves 11 is subdivided by narrow circumferential grooves 15 and slits 16 extending between the axial grooves 11.

With respect to the circumferential direction, the axial grooves 11 are inclined to the reverse direction to the cords 7C of the outermost belt ply 7B so as to cross the cords 7C.

The difference between the minimum angle βmin and the angle α of the cords 7C of the outermost belt ply 7B to the tire circumferential direction is set in the range of not more than 25 degrees:

$$|\beta min - \alpha| \leq 25 \text{degrees}.$$

As a result, the tread rigidity can be increased since the longitudinal direction of the blocks between the axial grooves 11 crosses the cord direction, and the slip can be prevented. If the difference |βmin−α| is more than 25 degrees, the effect to increase the tread rigidity decreases, and accordingly the slip sound can not be reduced. Further, the steering stability is also deteriorated. Thus, such range is not preferable.

More preferably, the difference is set in the range of not more than 20 degrees:

$$|\beta min - \alpha| \leq 20 \text{ degrees}.$$

The groove depth of the axial grooves 11 is preferably constant along the length thereof and in the range of from 4 to 10 mm (in this example about 8 mm).

The groove width Ge of the axial grooves 11 measured at the tread edges (E) is preferably in the range of 4 to 25 mm (in this example about 6 mm). And the groove width is gradually decreased from the tread edges (E) towards the tire equator (C). In this example, the groove width in the axially innermost end is decreased about 25% in comparison with that in the axially outermost end, whereby a great decrease in the rigidity of the axially inner blocks can be prevented.

It is possible to construct the axial grooves 11 to extend continuously from one of the tread edges (E) to the other. The shape of the blocks can be changed variously apart from the example shown in the figure.

Comparison tests

Test tires (195/65R15 radial tire for passenger cars) having the structure show in FIG. 1 and the tread pattern shown in FIG. 2 were made and tested for the following performances.

A) Steering stability and Ride comfort test

Running a test car (2500 cc front-wheel-drive car provided on the four wheels with test tires) in a tire test course, the performances was evaluated into ten ranks by the driver's feeling, based on that the prior art tire is 6. The larger the index, the better the performance.

Wheel rim size: 15×6-JJ

Tire air pressure: Front 200 kpa, Rear 200 kpa

B) Tire noise test

According to the test procedure specified in JASO/Z101-83, a test car was coasted for 50 meter distance at a speed of 60 km/h in a straight test course (ISO road surface) and the maximum noise sound level in dB(A) was measured at a frequency of 1.6 kHz and overall range with a microphone set at 1.2 meter height from the road surface and 7.5 meter sideways from the running center line in the midpoint of the course. The results are indicated by a relative value based on that the prior art tire is 0.

rigidity and as a result, the steering stability and the 1.6 kHz noise or the slip sound were greatly improved as shown in FIG. 3 where the 1.6 kHz peak disappeared in the Example tire. Additionally, the overall noise energy was effectively decreased as the slip sound is decreased. Thus, it is preferable that $|\beta min-\alpha|$ is not more than 10 degrees.

As described above, as the axial grooves are inclined reversely to the cords of the radially outermost belt ply and $|\beta min-\alpha|$ is set to be not more than 25 degrees, the tread rigidity is increased to improve the steering stability and prevent the occurrence of the slip noise.

EMBODIMENT 2

In order to prevent the drifting to one side of a vehicle by controlling the residual cornering force, the inclinations of the front and rear sides of the blocks 17 are varied.

In FIGS. 5–11, concerning the second embodiment, the tire 1 is also a radial tire for passenger cars.

Similar to the above-mentioned first embodiment, the tread portion 2 is provided with two circumferential grooves 13. Between the circumferential grooves 13, a circumferentially continuously extending rib 14 is formed.

The number of the circumferential grooves 13 is preferably 1 to 3. All the circumferential grooves 13 are disposed in only a central part M of the tread to increase the pattern rigidity and thereby improve the dry running performance. Thus, no circumferential groove is disposed outside the central part M. Here, the central part M is centered on the tire equator (C), and the axial width thereof is 25% of the ground contacting width TW. The ground contacting width TW is the axial distance between the tread edges (E) or the axial edges of the ground contacting area (S) of the tread portion 2 under a standard condition in which the tire 1 is mounted on a standard rim and inflated to a standard pressure and then loaded with a standard tire load.

TABLE 1

| Tire | Prior | Ex. 1 | Ex. 2 | Ex. 3 | Ex. 4 | Ex. 5 | Ex. 6 | Ex. 7 | Ref. 1 | Ref. 2 | Ref. 3 |
|---|---|---|---|---|---|---|---|---|---|---|---|
| Carcass | | | | | | | | | | | |
| Number of ply | 1 | | | | | | | | | | |
| Cord | 1500 d/2 polyester | | | | | | | | | | |
| Cord count | 52 ends | | | | | | | | | | |
| Cord angle | 88 degrees | | | | | | | | | | |
| Belt | | | | | | | | | | | |
| Number of ply | 2 | | | | | | | | | | |
| Code | steel | | | | | | | | | | |
| Cord count | 40 ends | | | | | | | | | | |
| Belt cord angle (deg) | | | | | | | | | | | |
| Inner ply | 22 | 22 | 22 | 22 | 22 | 22 | 22 | 19 | 22 | 19 | 22 |
| Outer ply α | 22 | 22 | 22 | 22 | 22 | 22 | 22 | 19 | 22 | 19 | 22 |
| Groove angle β (deg) | 20 | 20 | 25 | 30 | 35 | 40 | 45 | 35 | 50 | 40 | 50 |
| $|\beta-\alpha|$ | 2 | 2 | 3 | 8 | 13 | 18 | 23 | 16 | 28 | 21 | 28 |
| Groove inclination ‡1 | S | R | R | R | R | R | R | R | R | S | S |
| Tire noise dB(A) | | | | | | | | | | | |
| Overall | 0 | −0.7 | −0.6 | −0.4 | −0.2 | −0.1 | −0.1 | −0.2 | 0 | 0.1 | 0 |
| 1.6 kHz | 0 | −1 | −0.8 | −0.5 | −0.3 | −0.1 | −0.1 | −0.2 | −0.1 | 0.2 | 0.1 |
| Steering stability | 6 | 7 | 7 | 7 | 6 | 6 | 6 | 6 | 6 | 6 | 6 |
| Ride comfort | 6 | 6 | 6 | 6 | 6 | 6 | 6 | 6 | 6 | 6 | 6 |

‡1 R: reverse to the cord inclination of the outer belt ply
S: same as the cord inclination of the outer belt ply From the test results, it was confirmed that the Example tires were superior to the prior art tire in the tire noise. Especially, the Example tires 1 to 3 of which $|\beta min-\alpha|$ was not more than 10 degrees, were further increased in the tread The axial grooves 11 extend from the tread edges (E) to the axially outermost circumferential grooves 13A to form blocks 17 each defined by the circumferentially adjacent axial grooves 11, one of the tread edges (E) and one of the axially outermost circumferential grooves 13A. Further, each of the blocks 17 is provided with a blind groove 19 which extends axially inwardly from the tread edge (E) and terminates within the block 17 in the middle of the lateral part N. In the example in FIG. 6, all the axial grooves 11 and blind grooves 19 have a right side upward inclination. However, the inclination can be reversed as shown in FIG. 9.

The stream angle (θ) of each of the axial grooves 11 is set in the range of from 10 to 40 degrees. The stream angle (θ) is, as shown in FIG. 6, the angle between the tire equator (C) and a straight line AB, the straight line AB drawn from the intersecting point (A) of the axial groove 11 with the axial edge line (K) of the central part (M) that is a circumferential line (K) drawn at a distance of TW/8 from the equator (C), to the intersecting point (B) of the axial groove 11 with the tread edge line (L) that is the edge line of the ground contacting area (S).

The stream angle (θ) has a great influence on the steering stability on wet roads. If the angle exceeds 40 degrees, the water drainage becomes insufficient, and aquaplaning is liable to occur, decreasing the wet performance. If the angle is less than 10 degrees, road grip on dry roads becomes insufficient.

For better understanding of this embodiment, the followings are noted together with FIG. 8 in which a simplified model of the block 17 is shown. Giving an eye to each block 17, the rear edge (hereinafter heel edge) first contacts with the road surface and then the front edge (hereinafter toe edge). Next turning to the above-mentioned heel edge, the rear end (hereinafter far end Fr) first contacts with the road surface and then the front end (hereinafter near end Re). Further, giving an eye to the toe edge, the rear end (i.e. near end Re) first contacts with the road surface and then the front end (i.e. far end Fr).

Again turning back to FIG. 6, each block 17 has a toe edge and a heel edge both inclined to the same direction with respect to the tire axial direction, and each of the edges has a far end Fr and a near end Re. The block side face 9 along each of the toe and heel edges is gradually increased in the inclination angle from the near end Re to the far end Fr as shown in FIGS. 6–8. The inclination angle is measured in a tire cross section parallel with the tire equatorial plane, with respect to the tire radial direction. The angle α in the far end Fr is in the range of from 20 to 40 degrees. The angle α in the near end Re is in the range of from 0 to 20 degrees. Preferably, the block side face 9 extends smoothly between the ends Fr and Re.

Therefore, the moment caused on the block by the decreased stream angle (θ) can be canceled or decreased, and the drifting to one side of a vehicle can be controlled. If the angle α is less than 20 degrees and/or the angle β is not less than 20 degrees, as the difference therebetween is very small, the drifting to one side of a vehicle can not be controlled. If the angle α exceeds 40 degrees, the road grip becomes unbalanced between the right and left of the tire and the steering stability decreases. Further, as the groove volume decreases, wet performance also decreases.

Incidentally, for the cords of the belt 7, organic fiber cords, e.g. nylon, polyester, rayon, aromatic polyamide and the like and steel cords can be used.

Comparison Tests

Test tires (195/65R15 radial tire for passenger cars) having the structure show in FIG. 5 were made and tested for the following performances.

1) Dry road steering stability test

Running a test car provided on the four wheels with test tires on an asphalt-surfaced road, the steering stability was evaluated into five ranks by the driver's feeling, based on that 3 is standard. The larger the index, the better the performance.

Wheel rim size: 6 JJ

Inner pressure: 2.0 kgf/sq.cm

Tire load: 400 kgf

2) Wet performance test

Running the same test car on the wet road surface with a 5 mm depth water and the speed causing aquaplaning was measured. In the table, the results are indicated by an index based on that Ex.21 tire is 100. The larger the index, the better the wet performance.

3) Residual cornering force test

The cornering force was measured with using a flat belt cornering tester.

TABLE 2

| Tire | Ex. 21 | Ex. 22 | Ref. 21 | Ref. 22 | Ref. 23 | Ref. 24 |
|---|---|---|---|---|---|---|
| Tread pattern | FIG. 6 | FIG. 9 | FIG. 6 | FIG. 10 | FIG. 11 | *1 |
| No. of circum. grooves | 2 | 2 | 2 | 2 | 4 | 2 |
| Stream angle (θ) (deg) | 40 | 40 | 40 | 50 | 50 | — |
| Inclination *2 | RSU | LSU | RSU | RSU | RSU | |
| Type of angle in Table 3 | 1 | 2 | 3 | 3 | 3 | — |
| Steering stability (dry) | 3 | 3 | 3 | 3 | 2.5 | 3 |
| Wet performance | 100 | 102 | 98 | 90 | 104 | 85 |
| Residual CF (kgf) *3 | 7.2 | 4.5 | 12.6 | 7 | 7.4 | 5.6 |

*1) The circumferential grooves 13 only
*2) RSU = Right Side Upward inclination
LSU = Left Side Upward inclination
The cord inclination of the radially outermost belt ply was a right side upward inclination.
*3) (Right side is +)
The range of 0 to +10 kgf is preferable when the car runs on the left side of the road.

TABLE 3

| | | Angle (deg) | | | | | | | | | | |
|---|---|---|---|---|---|---|---|---|---|---|---|---|
| | Tread | a–a' | | b–b' | | c–c' | | d–d' | | e–e' | | f–f' |
| Type | pattern | a | a' | b | b' | c | c' | d | d' | e | e' | f | f' |
| 1 | FIG. 6 | α 25 | β 5 | γ 15 | γ 15 | β 5 | α 25 | α 25 | β 5 | γ 15 | γ 15 | β 5 | α 25 |
| 2 | FIG. 9 | β 5 | α 25 | γ 15 | γ 15 | α 25 | β 5 | β 5 | α 25 | γ 15 | γ 15 | α 25 | β 5 |
| 3 | FIG. 10 FIG. 11 | 10 | 10 | 10 | 10 | 10 | 10 | 10 | 10 | 10 | 10 | 10 | 10 |

Form the test results, it was confirmed that the Example tires were improved in the residual cornering force and the dry and wet running performance in comparison with the reference tires. Thus the drifting to one side of a vehicle can be controlled.

EMBODIMENT 3

In order to improve the steering stability without sacrificing the wet performance and pitch noise, the circumferential pitch lengths of the axial grooves 11 are increased in the tread middle part but decreased in the tread shoulder part.

In FIGS. 12–17, concerning the third embodiment, the tire 1 is also a radial tire for passenger cars.

The tread portion 2 is provided with a pair of axially inner circumferential grooves 13 each disposed on each side of the tire equator (C), and a pair of axially outer circumferential grooves 15 each disposed between one of the axially inner circumferential grooves 13 and the adjacent tread edge (E) As a result, the tread portion 2 is divided into a central part Cr between the axially inner circumferential grooves 13, a pair of middle parts Md between the axially inner and outer circumferential grooves 13 and 15, and a pair of shoulder parts Sh between the axially outer circumferential grooves 15 and the tread edges (E).

Between the axially inner circumferential grooves 13, a straight rib 14 is formed. The rib is devoid of any axial groove. Thus, the rib extends continuously in the circumferential direction. However, it is possible to provide axial grooves which do not extend across the whole width of the rib or the crown region Cr. As far as the rib substantially does not lost a circumferential continuity, it may be possible that a sipe or slit which has not a substantial groove width extends across the rib.

In this example, the axially inner circumferential grooves 13 are a straight groove extending continuously in the tire circumferential direction. A zigzag groove can be used, but a straight groove is used for better drainage.

The distance L1 of the axially inner circumferential grooves 13 measured from the groove center line to the tire equator (C) is not more than 15% of the ground contacting width TW, and preferably not less than 10%. If the distance L1 is more than 15%, although it is somewhat effective for noise reduction, the drainage from the crown region Cr decrease. If the distance L1 is less than 10%, the rigidity of the crown region Cr is liable to decrease, thus the steering stability on dry roads and noise are liable to deteriorate.

If the groove width of the axially inner circumferential grooves 13 is too small, the drainage is liable to become insufficient. Contrary, if the groove width is too large, noise is liable to increase. Thus, the groove width is set in the range of from 2 to 9%, preferably 3 to 7%, more preferably 5 to 7% of the ground contacting width TW. (in this embodiment 5.3%)

The axial distance L2 of the axially outer circumferential grooves 15 measure from the groove center line to the tread edges (E) is set in the range of from 9 to 21% of the ground contacting width TW. If the distance L2 is more than 21%, the noise is liable to increase. If the distance L2 is less than 9%, the noise decreases, but the rigidity of the shoulder part Sh decreases and the steering stability decreases.

If the groove width of the axially outer circumferential grooves 15 is too small, the drainage is liable to decrease. Contrary, if the width is too large, the noise is liable to increase. Thus, the groove width of the axially outer circumferential grooves 15 is preferably 1.8 to 2.6%, more preferably 2.0 to 2.4% of the ground contacting width TW.

The groove depth of the axially inner and outer circumferential grooves 9 and 10 is preferably not less than 5 mm, preferably not less than 7 mm.

Each shoulder part Sh is divided by first and second axial grooves 11a and 11b into a circumferential row of blocks 17a. The first axial grooves 11a extend from the tread edges (E) to the axially inner circumferential grooves 13. The second axial grooves 11b are disposed between the first axial grooves 11a, and extend from the tread edges (E) to the axially outer circumferential grooves 15 but not reached to the axially inner circumferential grooves 13.

The middle part Md is therefore divided by only the first axial grooves 11a into a circumferential row of blocks 17b. Accordingly, the number of the blocks 17b in the middle part Md is ½ of the number of the blocks 17a in the shoulder part Sh.

If the block number of the middle part Md is less than ½ of the block number on the shoulder part Sh, the wet performance greatly decreases and noise increases. If more than ½, the steering stability can not be improved.

If the groove width of the first and second axial grooves 11a and 11b is too small, the wet performance is liable to decrease. Contrary, if too large, noise is liable to increase. Thus, the groove width of the first and second axial grooves 11a and 11b is 2 to 4%, preferably 2.4 to 3.4%, more preferably 2.6 to 3.2% of the ground contacting width TW.

The groove depth is preferably not less than 5 mm.

The percentage of the grooved area to the whole tread area between the tread edges (E) is preferably not more than 28%, whereby the steering stability and wear resistance can be further improved.

Further, it is preferable that the middle part Md is not provided with a groove which has a groove width of not less than 2 mm and a depth of not less than 3 mm and crosses the first axial grooves. If such groove is disposed, the improvement in the block rigidity in the middle part Md is liable to be hindered. However, it is possible to dispose a sipe or slit which has a groove width of less than 1.0 mm, in other words, a narrow groove which has not a substantial width. For reducing room noise, the sipe is preferably disposed in the block 17b to extend substantially parallel to the first axial groove 11a.

In this example, the axially outer circumferential grooves 15 extend zigzag continuously in the circumferential direction to improve the wet performance, and, the segments 15a of the zigzag circumferential groove 15 are held in common with the first axial grooves 11a.

In the middle part Md and the shoulder part Sh, variable pitches are employed in the circumferential arrangement of the first and second axial grooves 11a and 11b. Further, the same variable pitches are employed in the zigzag pitches PG of the axially outer circumferential grooves 15, whereby the pitch noise can be improved. Thus, the number of the zigzag is equal to the number of the blocks 17a in the shoulder part Sh and 2 times the number of the blocks 17b in the middle part Md.

In the shoulder part Sh, the first and second axial grooves 11a and 11b preferably extend at an angle θ1 of 60 to 85 degrees with respect to the circumferential direction of the tire, whereby both the wet performance and noise can be maintained at a good level. If the angle θ1 is less than 60 degrees, the steering stability has a tendency to decrease. If the angle θ1 is more than 85 degrees, the wet performance has a tendency to decrease.

Further, in the middle part Md, the first axial grooves 11a preferably extend at an angle θ2 of 20 to 40 degrees with respect to the circumferential direction of the tire, whereby both the wet performance and noise can be maintained at a good level. If the angle θ2 is less than 60 degrees, the steering stability has a tendency to decrease. If the angle θ2 is more than 85 degrees, the wet performance has a tendency to decrease.

In the middle part Md, the inclination angle of the first axial grooves 11a with respect to the circumferential direction decrease from the axially outside to the inside to improve the drainage from the neighborhood of the tire equator. In this example, the angle changes from a certain value θ2a to a certain value θ2b in the middle of the length.

Further, the belt 7 in this example is composed of two cross plies 7A and 7B of steel cords laid at an angle of from 10 to 35 degrees with respect to the tire equator.

The axially inner circumferential grooves 13 may be formed in a zigzag form as shown in FIG. 14.

The axially outer circumferential grooves 15 may be formed in a straight form as shown in FIG. 15.

Comparison Tests

Test tires (195/65R15 91H radial tires for passenger car) having the structure shown in FIG. 12 were made by way of test and tested for the following performances.

A) Pitch noise and Room noise Test

Running a 2500 cc passenger car on a smooth road surface at a speed of 60 km/h, the pitch noise was evaluated into ten ranks by the test driver's feeling. Also the Room noise at 40 km/h was evaluated.

B) Wet performance (Resistance to aquaplaning) Test

A test car provided on all four wheels with test tires was run on an asphalt road with a 5 mm depth 20 meter long water pool along a 100 meter radius circle. Increasing the speed, the maximum lateral-G of the front wheel was measured in the speed range of 50 to 80 km/h. The test results are shown in Table 4, wherein the results are indicated by an index based on that the prior art tire 1 is 100. The larger the index, the higher the resistance to aquaplane.

C) Tire noise test

According to the test procedure specified in JASO/Z101-83, a test car was coasted for 50 meter distance at a speed of 60 km/h in a straight test course (ISO road surface) and the maximum noise sound level in dB(A) was measured with a microphone set at 1.2 meter height from the road surface and 7.5 meter sideways from the running center line in the midpoint of the course.

D) Steering stability test

Running a 2500 cc test car provided on four wheels with test tires in a test course, the steering stability was evaluated into ten ranks by the driver's feeling the larger the index, the better the stability. (10: excellent, 9: very good, 8: fairly good, 7: good, 6: allowable, 5: allowable limit)

Wheel rim: 15×6-JJ

Tire pressure: 200 kpa (front and rear)

TABLE 4

| Tire | Ex. 31 | Ex. 32 | Ex. 33 | Ex. 34 | Ex. 35 | Ex. 36 | Ex. 37 | Ex. 38 | Ex. 39 | Ex. 40 |
|---|---|---|---|---|---|---|---|---|---|---|
| Tread pattern | FIG. 13 | FIG. 13 | FIG. 13 | FIG. 13 | FIG. 14 | FIG. 15 | FIG. 13 | FIG. 13 | FIG. 13 | FIG. 13 |
| Inner circumferential groove width/TW (%) | 5.3 | 5.3 | 5.3 | 5.3 | 5.3 | 5.3 | 5.3 | 5.3 | 5.3 | 5.3 |
| L1/TW (%) | 10 | 15 | 10 | 10 | 10 | 10 | 10 | 10 | 10 | 10 |
| L2/TW (%) | 15 | 15 | 9 | 21 | 15 | 15 | 15 | 15 | 15 | 15 |
| Number of blocks | | | | | | | | | | |
| Middle part | 35 | 35 | 35 | 35 | 35 | 35 | 35 | 35 | 35 | 35 |
| Shoulder part | 70 | 70 | 70 | 70 | 70 | 70 | 70 | 70 | 70 | 70 |
| Angle θ1 (deg) | 70 | 70 | 70 | 70 | 70 | 70 | 40 | 60 | 85 | 90 |
| Angle θ2 (deg) | 23 | 23 | 23 | 23 | 23 | 23 | 23 | 23 | 23 | 23 |
| Pitch noise | 8 | 8 | 8 | 8 | 6 | 8 | 8 | 8 | 7 | 6 |
| Room noise | 8 | 8 | 8 | 8 | 6 | 8 | 8 | 8 | 7 | 7 |
| Wet performance | 110 | 103 | 101 | 112 | 104 | 112 | 112 | 110 | 109 | 106 |
| Tire noise dB(A) | 67.2 | 65.6 | 66.1 | 70.2 | 66.5 | 69.4 | 67.2 | 66.8 | 69.4 | 69.8 |
| Steering stability | 8 | 6 | 6 | 6 | 7 | 8 | 7 | 7 | 8 | 8 |

| Tire | Ex. 41 | Ex. 42 | Ex. 43 | Ex. 44 | Ex. 45 | Ref. 31 | Ref. 32 | Ref. 33 | Prior 31 | Prior 32 |
|---|---|---|---|---|---|---|---|---|---|---|
| Tread pattern | FIG. 13 | FIG. 13 | FIG. 13 | FIG. 13 | FIG. 13 | FIG. 13 | FIG. 13 | FIG. 13 | FIG. 17 | FIG. 17 |
| Inner circumferential groove width/TW (%) | 5.3 | 5.3 | 5.3 | 5.3 | 5.3 | 5.3 | 5.3 | 5.3 | 5.3 | 5.3 |
| L1/TW (%) | 10 | 10 | 10 | 10 | 10 | 20 | 10 | 10 | 10 | 10 |
| L2/TW (%) | 15 | 15 | 15 | 15 | 15 | 15 | 5 | 25 | 15 | 15 |
| Number of blocks | | | | | | | | | | |
| Middle part | 35 | 35 | 35 | 35 | 35 | 35 | 35 | 35 | 35 | 70 |
| Shoulder part | 70 | 70 | 70 | 70 | 70 | 70 | 70 | 70 | 35 | 70 |
| Angle θ1 (deg) | 70 | 70 | 70 | 70 | 70 | 70 | 70 | 70 | 70 | 70 |
| Angle θ2 (deg) | 10 | 20 | 40 | 60 | 35/23 ‡1 | 23 | 23 | 23 | 23 | 23 |
| Pitch noise | 8 | 8 | 8 | 6 | 8 | 8 | 8 | 8 | 4 | 8 |
| Room noise | 8 | 8 | 7 | 6 | 8 | 8 | 8 | 8 | 5 | 9 |
| Wet performance | 114 | 110 | 106 | 100 | 111 | 92 | 94 | 109 | 100 | 99 |
| Tire noise dB(A) | 68.7 | 68.3 | 66.6 | 66 | 67.2 | 63.9 | 65.7 | 72.8 | 67.9 | 65.4 |
| Steering stability | 6 | 7 | 8 | 8 | 8 | 5 | 5 | 5 | 8 | 4 |

‡1 θ2a/θ2b

From the test results, it was confirmed that the Example tires can be improved in the steering stability without sacrificing the wet performance and noise performance. Among the tread patterns shown in FIGS. 13, 14 and 15, the patterns having the straight inner circumferential grooves were superior in the steering stability. Further, in case of the straight inner circumferential grooves, the noise performance was improved when the axially outer circumferential grooves were zigzag, but when the axially outer circumferential grooves were straight, the wet performance was improved.

As explained above, as the number of blocks is increased in the shoulder part Sh, the pitch noise and room noise are effectively improved without sacrificing the wet performance. As the number of the blocks in the middle part Md is decreased, the block rigidity is increased and the steering stability can be improved.

What is claimed is:

1. A pneumatic tire comprising:
   a tread portion with tread edge lines of a ground contacting portion of the tire,
   a pair of sidewall portions,
   a pair of bead portions,
   a carcass extending between the bead portions,
   a belt disposed radially outside the carcass in the tread portion,
   said tread portion provided with a pair of circumferential grooves disposed within a central part to define a circumferentially extending rib therebetween, the central part centered on the tire equator,
   said tread portion provided on each side of the tire equator with axial grooves extending axially inwardly and continuously from the tread edges to the circumferential grooves to define circumferentially spaced blocks between the axial grooves,
   said axial grooves inclined to the same direction with respect to the tire axial direction to form a non-directional tread pattern, wherein said axial grooves have the following designs (a) and (b),
   (a) the inclination angle of each of the axial grooves with respect to the tire circumferential direction being decreased from an axially outer end thereof at the tread edge to an axially inner end thereof at the circumferential groove, so as to have a minimum inclination angle of less than 45 degrees, and a maximum inclination angle of from 60 to 85 degrees, and
   (b) a stream angle of each of said axial groove being in the range of 10 to 40 degrees, wherein the stream angle is the angle between the tire equator and a straight line drawn between the intersecting point of the axial groove with an edge line of said central part and the intersecting point of the axial groove with the tread edge line,
   each said block provided with a toe edge and a heel edge along the axial grooves, both the toe and heel edge inclined to the same direction with respect to the tire axial direction so that each of the toe and heel edges has a far end and a near end,
   the inclination angle of a side face of each said block measured in a tire cross section parallel with the tire equatorial plane, with respect to the tire radial direction, along each of the toe and heel edges is gradually increased from the near end to the far end.

2. The pneumatic tire according to claim 1, wherein said belt comprises at least two plies of cords laid at an inclination angle $\alpha$ of from 10 to 35 degrees with respect to the tire equator so that the cords of each ply cross the cords of other ply,
   said axial grooves being inclined in the reverse direction to the cords of the radially outermost ply of the belt, with respect to the tire circumferential direction,
   the angle $\alpha$ of the cords of the outermost belt ply with respect to the tire equator satisfies $|\beta min-\alpha| \leq 25$ degrees $\beta min \leq 45$ degrees wherein
   $\beta min$ is the minimum inclination angle of each said axial groove measured along the entire length of the axial groove with respect to the tire circumferential direction.

3. The pneumatic tire according to claim 2 wherein the minimum angle $\beta min$ and the cord angle $\alpha$ satisfy $|\beta min-\alpha| \leq 20$ degrees.

4. The pneumatic tire according to claim 3 wherein the inclination angle of each said axial groove decreases from the axially outer end to the inner end by two or three steps.

5. The pneumatic tire according to claim 3 wherein the inclination angle of each said axial groove gradually decreases from the axially outer end to the inner end.

6. The pneumatic tire according to claim 2 wherein the inclination angle of each said axial groove decreases from the axially outer end to the inner end by two or three steps.

7. The pneumatic tire according to claim 2 wherein the inclination angle of each said axial groove gradually decreases from the axially outer end to the inner end.

8. The pneumatic tire according to claim 1, wherein said belt comprises at least two plies of cords laid at an inclination angle a of from 10 to 35 degrees with respect to the tire equator so that the cords of each ply cross the cords of other ply,
   said axial grooves being inclined in the reverse direction to the cords of the radially outermost ply of the belt, with respect to the tire circumferential direction,
   the angle $\alpha$ of the cords of the outermost belt ply with respect to the tire equator direction satisfies $|\beta min-\alpha| \leq 25$ degrees $\beta min \alpha \leq 45$ degrees wherein
   $\beta min$ is the minimum inclination angle of each said axial groove measured along the entire length of the axial groove with respect to the tire circumferential direction, and
   said central part having a width of 25% of the ground contacting width.

9. The pneumatic tire according to claim 1, wherein the central part has a width of 25% of the ground contacting width between the tread edges.

10. A pneumatic tire comprising:
    a tread portion with tread edge lines along a ground contacting portion of the tire,
    a pair of sidewall portions,
    a pair of bead portions,
    a carcass extending between the bead portions,
    a belt disposed radially outside the carcass in the tread portion,
    said tread portion provided with a pair of circumferential grooves disposed within a central part to define a circumferentially extending rib therebetween, the central part centered on the tire equator,
    said tread portion provided on each side of the tire equator with axial grooves extending axially inwardly and continuously from the tread edges to the circumferential grooves to define circumferentially spaced blocks between the axial grooves,
    said axial grooves inclined to the same direction with respect to the tire axial direction to form a non-directional tread pattern, wherein said axial grooves have the following designs (a) and (b), (a) the inclination angle of each of the axial grooves with respect to the tire circumferential direction being decreased from an axially outer end thereof at the tread edge to an axially inner end thereof at the circumferential groove, so as to have a minimum inclination angle of less than 45 degrees, and a maximum inclination angle of from 60 to 85 degrees, and (b) a stream angle of each of said axial groove being in the range of 10 to 40 degrees, wherein the stream angle is the angle between the tire equator and a straight line drawn between the intersecting point of the axial groove with an edge line of said central part and the intersecting point of the axial groove with the tread edge line, each said block, defined between the axial grooves, and extending continuously from the circumferential groove to the tread edge, and having a toe edge and a heel edge both inclined to the same direction with respect to the tire axial direction so that each of the toe and heel edges has a far end and a near end, the inclination angle of the side face of each said block measured in a tire cross section parallel with the tire equatorial plane, with respect to the radial direction, along each of the toe and heel edges being gradually increased from the near end to the far end, and said inclination angle of the side face at the far end being in the range of from 20 to 40 degrees with respect to the radial direction and said inclination angle of the side face at the near end being in the range of from 0 to 20 degrees with respect to the radial direction.

11. A pneumatic tire comprising:

a tread portion with tread edge lines along a ground contacting portion of the tire, a pair of sidewall portions, a pair of bead portions, a carcass extending between the bead portions, a belt disposed radially outside the carcass in the tread portion, said tread portion provided with a pair of circumferential grooves disposed within a central part to define a circumferentially extending rib therebetween, the central part centered on the tire equator, said tread portion provided on each side of the tire equator with axial grooves extending axially inwardly and continuously from the tread edges to the circumferential grooves to define circumferentially spaced blocks between the axial grooves, said axial grooves inclined to the same direction with respect to the tire axial direction to form a non-directional tread pattern, wherein said axial grooves have the following design(a), (a) the inclination angle of each of the axial grooves with respect to the tire circumferential direction being decreased from an axially outer end thereof at the tread edge to an axially inner end thereof at the circumferential groove, so as to have a minimum inclination angle of less than 45 degrees, and a maximum inclination angle of from 60 to 85 degrees, and each said block, defined between the axial grooves, and extending continuously from the circumferential groove to the tread edge, and having a toe edge and a heel edge both inclined to the same direction with respect to the tire axial direction so that each of the toe and heel edges has a far end and a near end, the inclination angle of the side face of each said block measured in a tire cross section parallel with the tire equatorial plane, with respect to the radial direction, along each of the toe and heel edges being gradually increased from the near end to the far end, and the inclination angle of the side face at the far end being in the range of from 20 to 40 degrees with respect to the radial direction and the inclination angle of the side face at the near end being in the range of from 0 to 20 degrees with respect to the radial direction.

* * * * *